(12) United States Patent
Cordova Val et al.

(10) Patent No.: US 8,891,718 B2
(45) Date of Patent: Nov. 18, 2014

(54) SYSTEM FOR SIMULTANEOUS TRANSMISSION OF MORSE SIGNALLING OVER A RADIO COMMUNICATION USING DIGITAL TECHNOLOGY

(71) Applicant: Teltronic, S.A., Zaragoza (ES)

(72) Inventors: Javier Cordova Val, Zaragoza (ES); Ignacio Cano Lazaro, Zaragoza (ES); Roman Abadias Pelacho, Zaragoza (ES)

(73) Assignee: Teltronic, S.A., Zaragoza (ES)

( * ) Notice: Subject to any disclaimer, the term of this patent is extended or adjusted under 35 U.S.C. 154(b) by 73 days.

(21) Appl. No.: 13/765,743

(22) Filed: Feb. 13, 2013

(65) Prior Publication Data

US 2013/0208829 A1    Aug. 15, 2013

(30) Foreign Application Priority Data

Feb. 14, 2012    (ES) .................................. 201230224

(51) Int. Cl.
*H04L 23/00*    (2006.01)
*H04L 27/04*    (2006.01)
*H04L 27/08*    (2006.01)

(52) U.S. Cl.
CPC ................ *H04L 27/04* (2013.01); *H04L 27/08* (2013.01)
USPC .............. 375/377; 370/527; 370/529; 341/66

(58) Field of Classification Search
USPC ................. 375/259, 285, 295–297, 300, 377; 370/480, 498, 527, 529; 341/66
See application file for complete search history.

(56) References Cited

U.S. PATENT DOCUMENTS

| | | | | |
|---|---|---|---|---|
| 3,808,558 | A | * | 4/1974 | Toman et al. ................. 332/108 |
| 2002/0016674 | A1 | * | 2/2002 | Rudow et al. ................. 701/215 |
| 2009/0310709 | A1 | * | 12/2009 | Bare ............................. 375/300 |
| 2013/0070872 | A1 | * | 3/2013 | Macrae ........................ 375/300 |

FOREIGN PATENT DOCUMENTS

| | | |
|---|---|---|
| GB | 2 321 574 | 7/1998 |
| WO | 96/25807 | 8/1996 |

OTHER PUBLICATIONS

Spanish Search Report, issued Dec. 7, 2012 (with partial English translation) in Spanish application that is a foreign counterpart to the present application.
Industry Canada, Radiocommunications and Broadcasting Regulatory Branch; "RC15—Radio Station Identification—Spectrum Management and Telecommunications", Jun. 2008.

* cited by examiner

*Primary Examiner* — Jean B Corrielus
(74) *Attorney, Agent, or Firm* — Wenderoth, Lind & Ponack, LLP.

(57) ABSTRACT

A system for simultaneous transmission (1) of Morse signaling over a radio communication using digital technology, comprising a signal generator (2) with at least one digital modulation which includes at least one amplitude modulation component; a Morse code generator (3) that generates Morse tones in analog form; and a first attenuator module (4), controlled by the Morse code generator (4). In this way, a signal with digital modulation generated by the signal generator (2) is attenuated in amplitude by the first attenuator module (4), the amplitude attenuation being the function of the amplitude of the waveform generated by the Morse code generator (3). In this way the transmission of information by digital modulation is simultaneous with the transmission of the Morse code by analog amplitude modulation (AM), using one single radiofrequency (RF) carrier signal and without service interruption or information loss.

5 Claims, 5 Drawing Sheets

SYSTEM FOR SIMULTANEOUS TRANSMISSION OF MORSE SIGNALLING OVER A RADIO COMMUNICATION USING DIGITAL TECHNOLOGY

OBJECT OF THE INVENTION

The present invention relates to a system for the simultaneous transmission of Morse signaling over a radio communication using digital technology, the digital modulation used having an amplitude modulation component of the radiofrequency (RF) carrier signal and the transmission being carried out by means of an analog amplitude modulation (AM) over the same radiofrequency RF carrier of a Morse code corresponding to an identifier assigned to the radio transmitter, enabling that at the moment of the transmission of said identifier, the digital service is not interrupted.

Therefore, the objective is to be able to simultaneously transmit digital and analog signals without information loss of either signal.

FIELD OF USE

The invention is for use in the radio communications industry for those countries where it is required that each one of the radio transmitters that comprise a network, emit a unique identifier by means of voice or Morse code.

BACKGROUND OF THE INVENTION AND TECHNICAL PROBLEM TO BE RESOLVED

Currently, there are digital radio communication systems that allow, through their digital modulations, to provide an optimization of the features of the communications and the services provided to the users of said communications networks. An example of these technologies is the European standard TETRA, whose air interface for communications of voice plus data (V+D) is defined by the document ETSI EN 300 392-2 "Terrestrial Trunked Radio (TETRA) Voice plus Data (V+D)". Said document contains the specifications for the physical layer, the data link layer and the network layer according to the ISO model.

In said standard, the services used for establishing traffic calls, for permitting both voice calls as well as data calls are defined, together with the state services of message data and of short data (Short Data Service SDS) of the TETRA standard, in addition to other services.

This technology is widely spread, accepted and established throughout the world to carry out professional communications of various security and emergency bodies, as well as for use in transport sectors and industrial sector companies.

Digital systems base their transmissions on digital modulations in which one or various bits form symbols and these, in turn, modulate a radiofrequency (RF) carrier signal in amplitude, phase, frequency or a combination of these. This is the case with TETRA technology which uses the modulation pi/4DQPSK.

In order to introduce systems of this type of technology, it is necessary that the regulatory authorities of different countries in which they are established, assign dedicated frequencies and frequencies of continuous usage for the operating of this type of network.

However, in certain countries, it is necessary to generate radio transmission identifiers, through analog modulations which require the emission of voice or Morse tones to be able to identify at a given time, the specific use of a frequency in the radio spectrum regulated in said country.

Currently, for example in USA and Canada, it is obligatory that all equipment that transmits a RF signal into the air, emit an identifier code, at given periods of time, every 15 or 30 minutes, according to each case, using voice or Morse code. This code is referred to in the regulations that regulate the use of the radio spectrum Call Sign or Station Identification, although there may also be other different names, for example, Continuous Wave Identification (CW ID).

The transmission of the identifier should be carried out using analog amplitude modulation (AM), frequency modulation (FM) or phase modulation (PM).

There are exceptions in which it is permitted that the equipment which use digital modulations can apply alternative methods to those mentioned. In the cases in which said exceptions are not permitted, the radio systems stop the transmission of the digital signal to send said identifier, in a way that produces a break in the service although not in the call itself, that is, if there is speech the break is not produced and the service is broken when the speaking is over.

The bodies that regulate the use of the radio spectrum are Federal Communications Commission (FCC) in the USA and Industry Canada (IC) in Canada. The regulations in which the identifier emission of the radio equipment is regulated and which are applied to the TETRA radio systems are the document Title 47 CFR Chapter I Part 90 in USA, specifically the points 90.425 and 90.647, and the document RIC-15 Issue 2 Radio Station Identification in Canada.

According to the previously mentioned, a digital radio communication system designed for maintaining continuous transmissions and thus being able to provide a continuous service over time, must interrupt the digital signal transmission at every certain time interval to generate by means of analog modulation, the identification of the base station coded in Morse, in those countries that require said signaling, such as USA and Canada. This currently means, for countries such as those mentioned in the example, that digital systems intended for critical missions, such as those for security and emergency services, are affected for a few seconds due to the imperative transmission of said Morse signaling every 15 to 30 minutes, which may cause the blocking of an emergency call for lack of availability of free traffic channels at a given time.

The present invention solves the interaction of the two transmissions, digital and analog, simultaneously maintaining a service continued by both technologies, avoiding the interruption of the digital transmissions and thus preserving the security of people in critical situations and who make use of said technologies.

As background of the state of the art, the U.S. Pat. No. 5,559,807 A, can also be cited, which shows a TDMA mobile communication system with a base station and a plurality of remote units.

DESCRIPTION OF THE INVENTION

The present specification describes a system for simultaneous transmission of Morse signaling over a radio communication using digital technology that is based on enabling the transmitter to simultaneously emit over a single RF carrier, the digital modulation that contains the information of the communications of the system, and an analog modulation corresponding to the identifier, required in certain countries, by means of Morse code, with the objective of preventing the interruption of the service of the digital communications during said concurrent transmissions.

Therefore, the present specification describes four variants of a practical realization which allow said simultaneous transmission of both modulations, digital and analog.

The invention relates to a system for the simultaneous transmission of Morse signaling over a radio communication using digital technology. The digital modulation used has an amplitude modulation component of the radiofrequency (RF) carrier signal, being the type of radio communication systems that, at every certain time interval, is necessary to generate a Morse signaling of identification in every base station. The transmission system comprises:

- a signal generator with digital modulation with at least one digital modulation wherein there is at least one amplitude modulation component;
- a Morse code generator that generates analogic Morse tones;
- a first attenuator module, through which the signal with digital modulation is transmitted, which acts as a variable amplitude attenuator of said signal.

The signal produced by the digital modulation generator is transmitted via the first attenuator module controlled by the Morse code generator, in a way that this signal suffers an attenuation that is function of the amplitude of the waveform generated by the Morse code generator, transmitting the digital signal simultaneously with the analog signal without service interruption or information loss of both signals.

Thus, in a first variant of practical realization, the radiofrequency (RF) signal produced by the digital modulation generator is transmitted via the first attenuator module and controlled by the Morse code generator, in a way that this signal suffers an attenuation that is function of the amplitude of the waveform generated by the Morse code generator.

A second variant of practical realization, the signal produced by the baseband generator of the digital modulation is transmitted through the first attenuator module controlled by the Morse code generator, said signal suffering an attenuation that is function of the amplitude of the waveform of the Morse code tones generated, in a way that the signal obtained at the output of the first attenuator module, enters in a modulator that generates a radiofrequency (RF) signal with digital modulation and whose envelope is modulated in amplitude by the waveform with which the Morse code generated by the Morse code generator is carried out.

In a third variant of practical realization, the transmitter includes:
- a linearization block;
- a power amplifier;
- a second attenuator module;
- an antenna and;
- a directional coupler, in a way in which the signal produced by the signal generator with digital modulation that passes through the linearization block and the resulting radiofrequency (RF) signal is introduced in the first attenuator module whose attenuation is function of the amplitude of the waveform generated by the Morse code generator, and is amplified, until the final transmission power, in a power amplifier in order to be emitted by the antenna. In this way, a sample of the output signal of the power amplifier is fed back by means of a directional coupler, passing through a second attenuator module, whose attenuation varies according to the inverse of the function that determines the attenuation of the first attenuator module from the amplitude of the waveform generated by the Morse code generator. Finally, the output signal of the second attenuator module is fed back in the linearization block to be used according to the corresponding linearization technique.

In a fourth variant of practical realization, the transmitter includes:
- an error amplifier;
- an I/Q modulator;
- a power amplifier;
- a pair of level adjustment amplifiers of the RF signal with digital modulation;
- a second variable attenuator;
- an antenna
- a directional coupler;
- a micro controller;
- an I/Q demodulator and;
- a baseband amplifier;
- having a transmitter with Cartesian feedback for the linearization of the power amplifier. Forming the directional coupler, the second attenuator module, the demodulator, the baseband amplifier and the error amplifier a Cartesian feedback loop, configured to carry out the Cartesian feedback.

The signal generator produces symbols, decomposed into signals in phase "$I_{in}$" and in quadrature "$Q_{in}$", corresponding to the digital modulation in the baseband; the signals "$I_{in}$", "$Q_{in}$", a signal "$I_{feedback}$" and a signal "$Q_{feedback}$" enter the error amplifier being the signals "$I_{feedback}$" and "$Q_{feedback}$" produced by the baseband amplifier; the error amplifier amplifies the signals "$I_{in}$-$I_{feedback}$" and "$Q_{in}$-$Q_{feedback}$"; the output signals "$I_{mod}$" and "$Q_{mod}$" of the error amplifier enter the modulator that generates the RF signal with digital modulation; the level of the RF signal is adjusted by means of the first amplifier; the adjusted RF signal enters the first attenuator module, where it is attenuated as a function of the amplitude of the waveform generated by the Morse code generator; the attenuated RF signal is amplified by the second amplifier and by the power amplifier to reach a final transmission power to be transmitted by the antenna and, furthermore, a sample of the output signal of the power amplifier is fed back to the error amplifier by means of: the directional coupler; the second attenuator module with which the output level of the directional coupler is adjusted, and whose attenuation varies according to an inverse of a function that determines the attenuation of the first attenuator module based on the amplitude of the waveform generated by the Morse code generator; the demodulator that generates the signals "$I'_{feedback}$" and "$Q'_{feedback}$", and the baseband amplifier that adjusts the level of the signals "$I'_{feedback}$" and "$Q'_{feedback}$" generating the signals "$I_{feedback}$" and "$Q_{feedback}$". To complete the following description that will be described, and with the objective of aiding a better understanding of the features of the invention, accompanying the present specification is a set of plans, wherein whose figures, by way of non-limitative example, the most characteristic details of the invention are represented.

BRIEF DESCRIPTION OF THE DRAWINGS

Following is a detailed description of the invention in reference to the figures that accompany it, and wherein the following drawings are shown.

Figure 1:
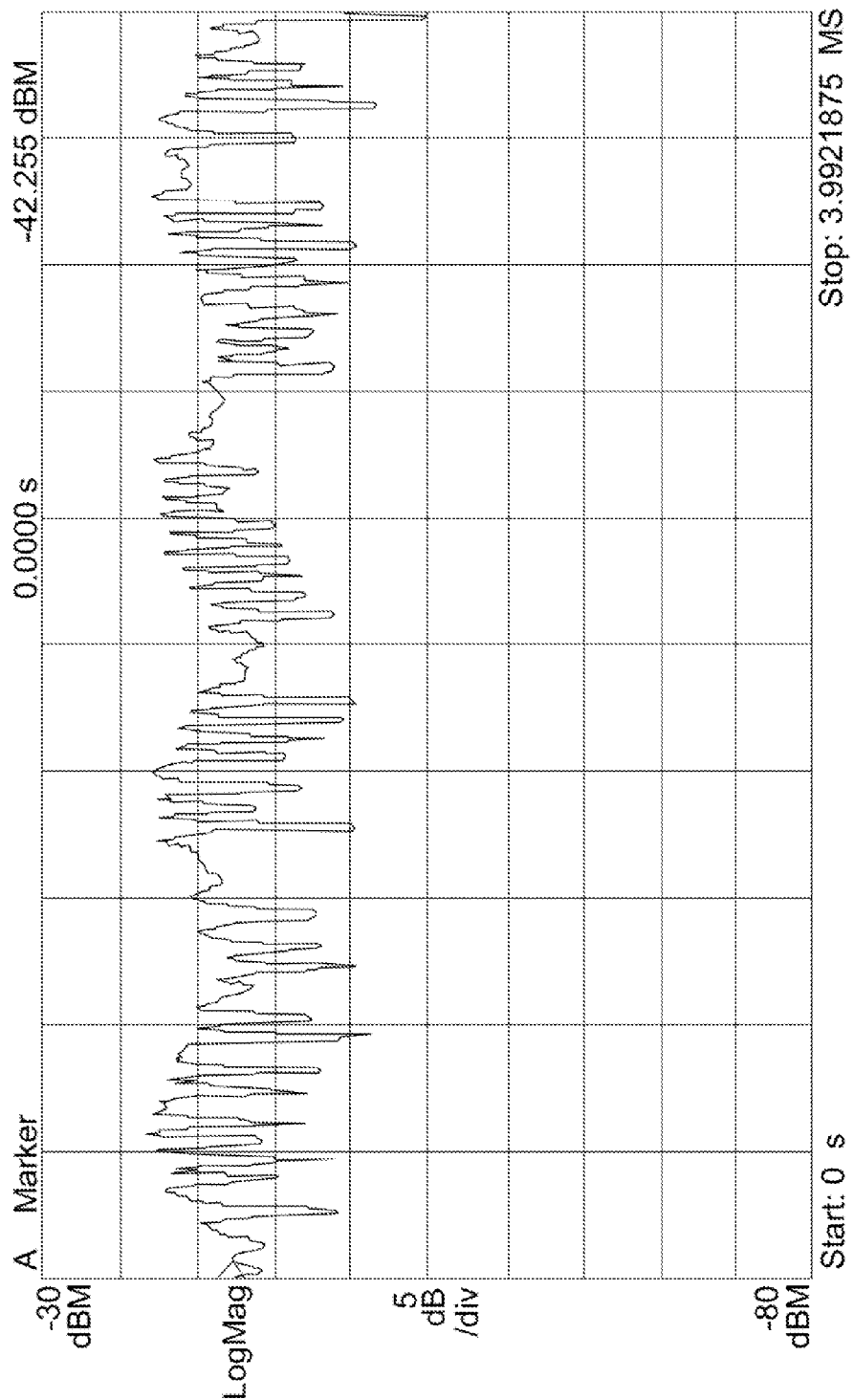
FIG. 1.—Shows a graph of power (dBm) vs. time (ms) of a RF signal with TETRA modulation pi/4-DQPSK, in turn modulated in amplitude with a tone of 1 KHz.

Below is a list of the numerical references used in the figures:

1. System for transmission
2. Signal generator
3. Morse code generator
4. First attenuator module
5. Modulator
6. Linearization block
7. Power amplifier
8. Second attenuator module
9. Antenna
10. Directional coupler
11. Error amplifier
12. First amplifier, connected to the output of the modulator
13. Second amplifier, connected to the output of the first attenuator module
14. Micro controller
15. Demodulator
16. Baseband amplifier

DESCRIPTION OF A PREFERRED EMBODIMENT

The present invention relates to a system for simultaneous transmission of Morse signaling over a radio communication using digital technology, being based on enabling a transmitter to simultaneously emit the digital modulation that contains the own information of the system communications and an analog modulation corresponding to the identifier, requested in certain countries, using Morse code, with the objective of preventing the interruption of the digital communication service during said concurrent transmissions.

Therefore, in the present specification, four variants of practical realization have been described, that allow said simultaneous transmission of both modulations, digital and analog.

More specifically, the present invention consists in transmitting said identifier in Morse code by means of analog amplitude modulation (AM) over a RF signal with digital modulation. Said digital modulation can, in turn, produce a modulation in amplitude, phase, or frequency over the carrier signal of the RF, as is the case with modulation pi/4-DQPSK used in the TETRA standard, which produces a modulation in amplitude and phase over the RF carrier. The fact that the invention is based on the embodiment of a modulation in amplitude over an already existing modulation, this equally being able to have a component of modulation in amplitude, may mean a contradiction for a person skilled in the art, since it is logical to consider that the introduction of variations of amplitude in a signal with modulation in amplitude will produce a loss of information therein.

Firstly, a number of considerations are carried out with respect to the present invention, which is based on a system for enabling digital transmissions and analog transmissions simultaneously, generated for the Morse code required by certain countries, without ceasing to provide digital service during the said concurrent transmissions.

Although the present invention can be applied to different radio standards and to different digital modulations, the digital radio standard TETRA and the modulation pi/4-DQPSK used in said standard have been used as a reference, wherein the following keys are identified:

The digital modulation pi/4-DQPSK, used in the TETRA standard, has a modulation in phase and in amplitude of the RF carrier signal. To receive it correctly, it is necessary to use transmission equipment and receivers that do not produce distortion in the modulated signal in a way that does not alter the parameters of phase and amplitude. It is for this reason that there may appear to be a contradiction the act of adding an analog amplitude modulation (AM) to a signal with digital modulation pi/4-DQPSK.

For the transmission of Morse symbols, frequency tones of between 800 and 1200 kilohertz (KHz) are used. The period of these signals ranges therefore, from between 0.833 and 1.250 milliseconds (ms), which is more than 15 times greater than the symbol time of the TETRA modulation pi/4-DQPSK, which is 0.055 ms. This difference in time is what enables to modulate the tones of the Morse code over the RF signal with TETRA digital modulation, since the variation that said modulation in amplitude produces over the envelope of the RF signal with TETRA modulation does not come to affect the decoding of the transmitted symbols.

In the case that a pure tone or sinusoidal wave is used to carry out the Morse code, the modulation in amplitude over the TETRA signal will produce a sinusoidal variation of the envelope of the RF signal with TETRA modulation, as shown in FIG. 1. This sinusoidal variation does not affect the decoding of the TETRA symbols because the modulation pi/4-DQPSK is a differential modulation, that is, that each symbol is modulated and demodulated using the previous symbol as the only reference, and the relative difference between the amplitude of one symbol and the previous one associated with the sinusoidal variation produced in the envelope by the AM modulation of a tone around 1 KHz is negligible compared to the difference of amplitude between the own symbols of the modulation TETRA pi/4-DQPSK, since, as analyzed in the previous paragraph, the time period of the tone is more than 15 times greater than the symbol time and thus, the variation that is produced in the envelope is sufficiently slow as to not affect the decoding of the TETRA symbols.

In the case that another waveform is used, different to a pure tone, to carry out the Morse code, such as a train of pulses, the AM modulation over the RF signal with TETRA modulation may produce jumps or abrupt changes in the envelope Reducing the maximum number of jumps, as well as the rise time and fall time, and due to the time period of said waveform being more than 15 times greater than the TETRA symbol time, the number of symbols affected can be reduced in such a way that the error correction techniques of TETRA standard maintain the quality of the service within the permitted limits by the standard itself.

The conclusion of the previous analysis is that the transmission of a Morse code identifier through analog amplitude modulation (AM) over a RF signal with digital modulation pi/4-DQPSK, the time period of the waveform used for the Morse code being sufficiently greater with respect to the symbol time of the digital modulation, it would not hinder the efficient behavior of the TETRA system. This same analysis may be applied to different radio standards and to different digital modulations.

Following is a description of four possible embodiments of a system for transmitting the said identifier in Morse code using analog amplitude modulation (AM) over a RF signal with digital modulation. These possible embodiments correspond to FIGS. 2, 3, 4 and 5.

Figure 2:
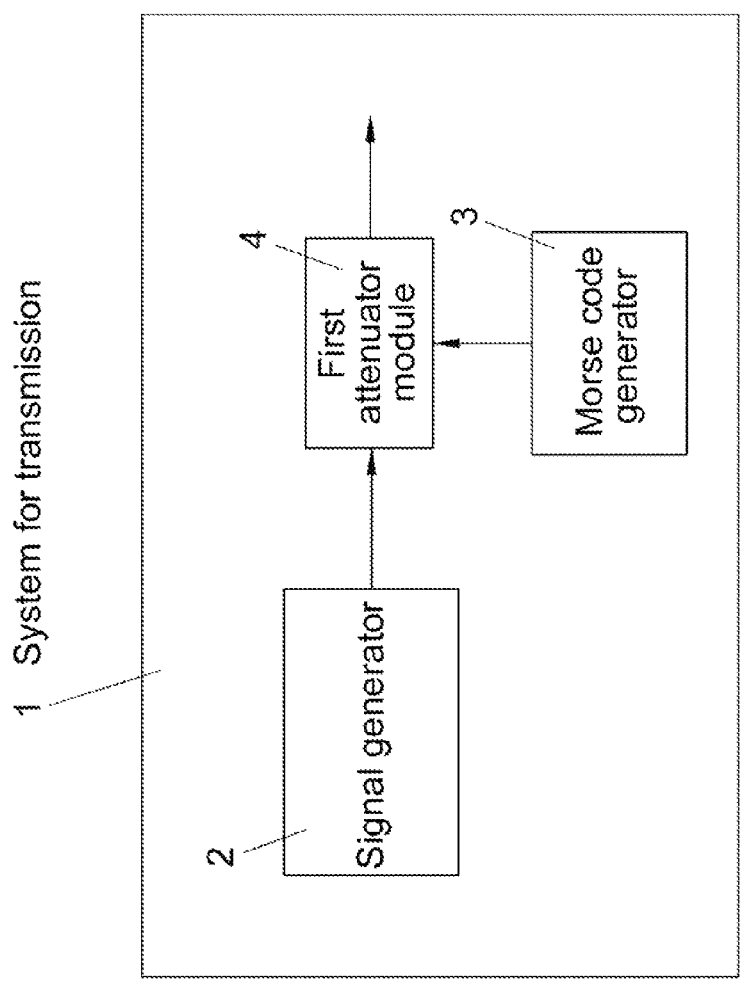
FIG. 2.—Shows a first diagram of blocks of a system for modulating in amplitude a Morse code over a RF signal with digital modulation.

FIG. 2 proposes as a possible transmission system 1 a generator 2 that produces in its output a RF signal with digital modulation, which is transmitted via a first attenuator module 4 controlled by a Morse code generator 3 in a way that this signal suffers an attenuation that is function of the amplitude of the waveform generated by the Morse code generator 3, transmitting the digital signal simultaneously with the analog signal without information loss of either signal.

Figure 3:
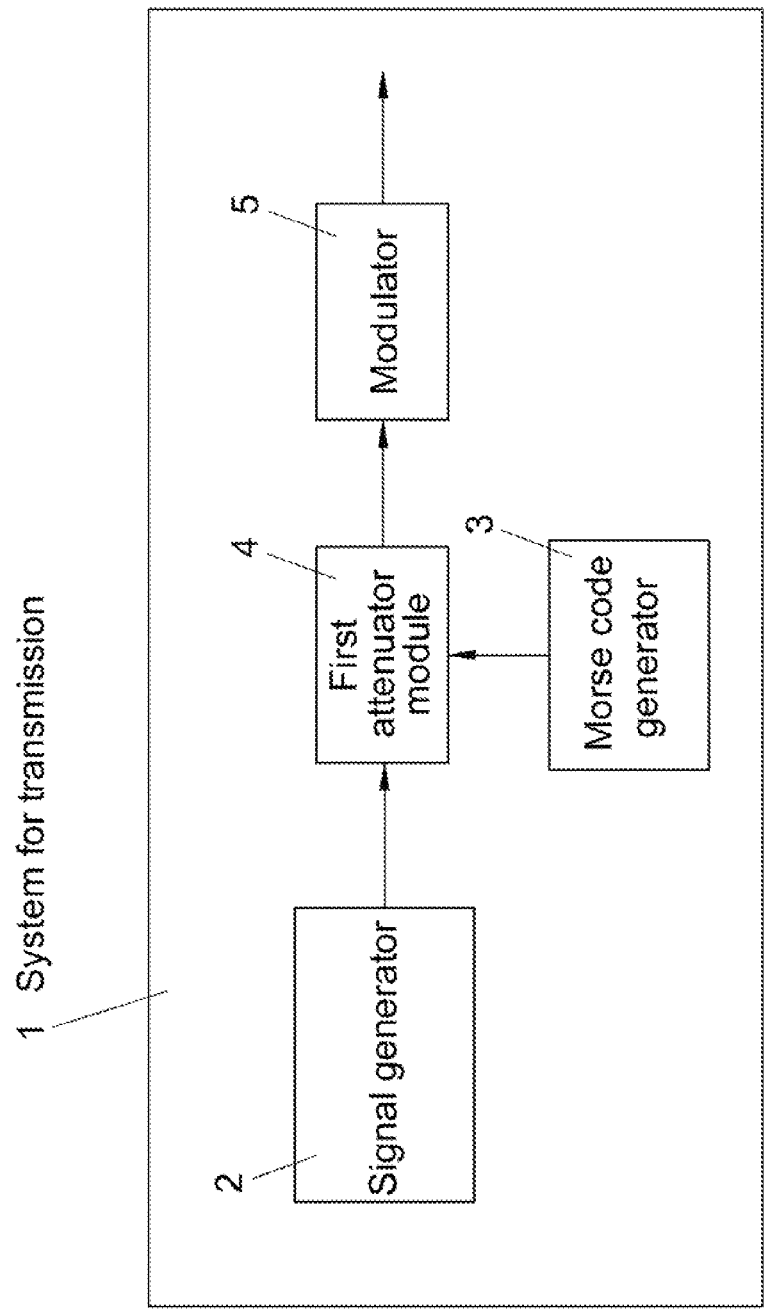
FIG. 3.—Shows a second diagram of blocks of a system for modulating in amplitude a Morse code over a baseband signal, in a way that the resulting signal enters a modulator that generates the RF signal with digital modulation.

FIG. 3 proposes a transmission system 1 wherein the signal produced by the baseband generator of the digital modulation 2 is transmitted via the first attenuator module 4 controlled by the Morse code generator 3, said signal suffering an attenuation that is function of the amplitude of the waveform generated by the Morse code generator 3, in a way that the signal obtained at the output of the first attenuator module 4 enters the modulator 5 that generates a RF signal with digital modulation and whose envelope is modulated in amplitude by the waveform with which the Morse code is carried out by the Morse code generator 3.

Figure 4:
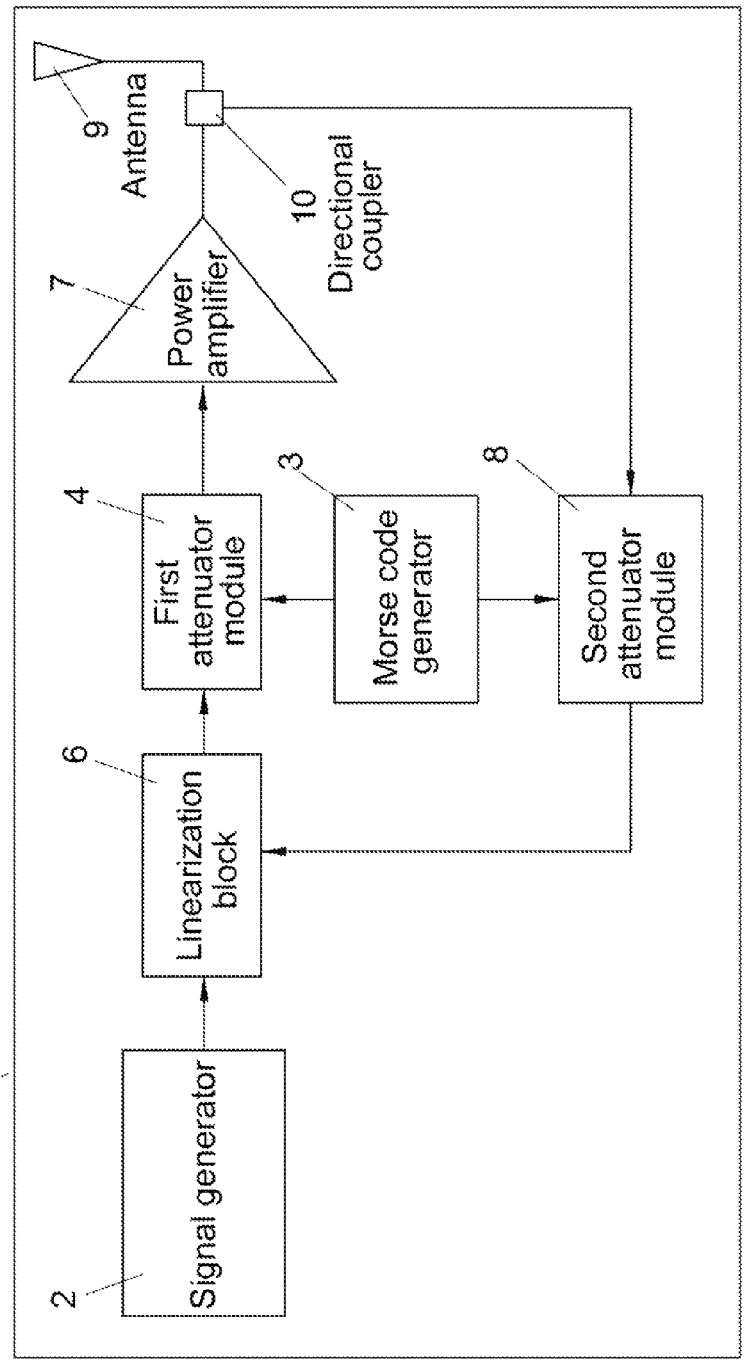
FIG. 4.—Shows a diagram of blocks of a transmission system that emits a RF signal with digital modulation over that which a Morse code is modulated in AM, in a way that the transmitter includes a linearization block in which any linearization technique can be carried out, such as the predistortion.

FIG. 4 proposes a transmitter 1 with a linearization block 6 that can be applied to any linearization system such as pre-distortion.

In this transmitter 1, the signal produced by the signal generator with digital modulation 2 passes through the linearization block 6 and the resulting RF signal is introduced in the first attenuator module 4 whose attenuation is function of the amplitude of the waveform generated by the Morse code generator 3, and is amplified to the final transmission power by the power amplifier 7 to be emitted through the antenna 9.

Furthermore, a sample of the output signal of the power amplifier 7 is fed back by means of a directional coupler 10, passing through a second attenuator module 8, whose attenuation varies according to the inverse of the function that determines the attenuation of the first attenuator module 4 from the amplitude of the waveform generated by the Morse code generator 3, and finally, the signal of the output of the second attenuator module 8 is fed back in to the linearization block 6 to be used according to the corresponding linearization technique.

Figure 5:
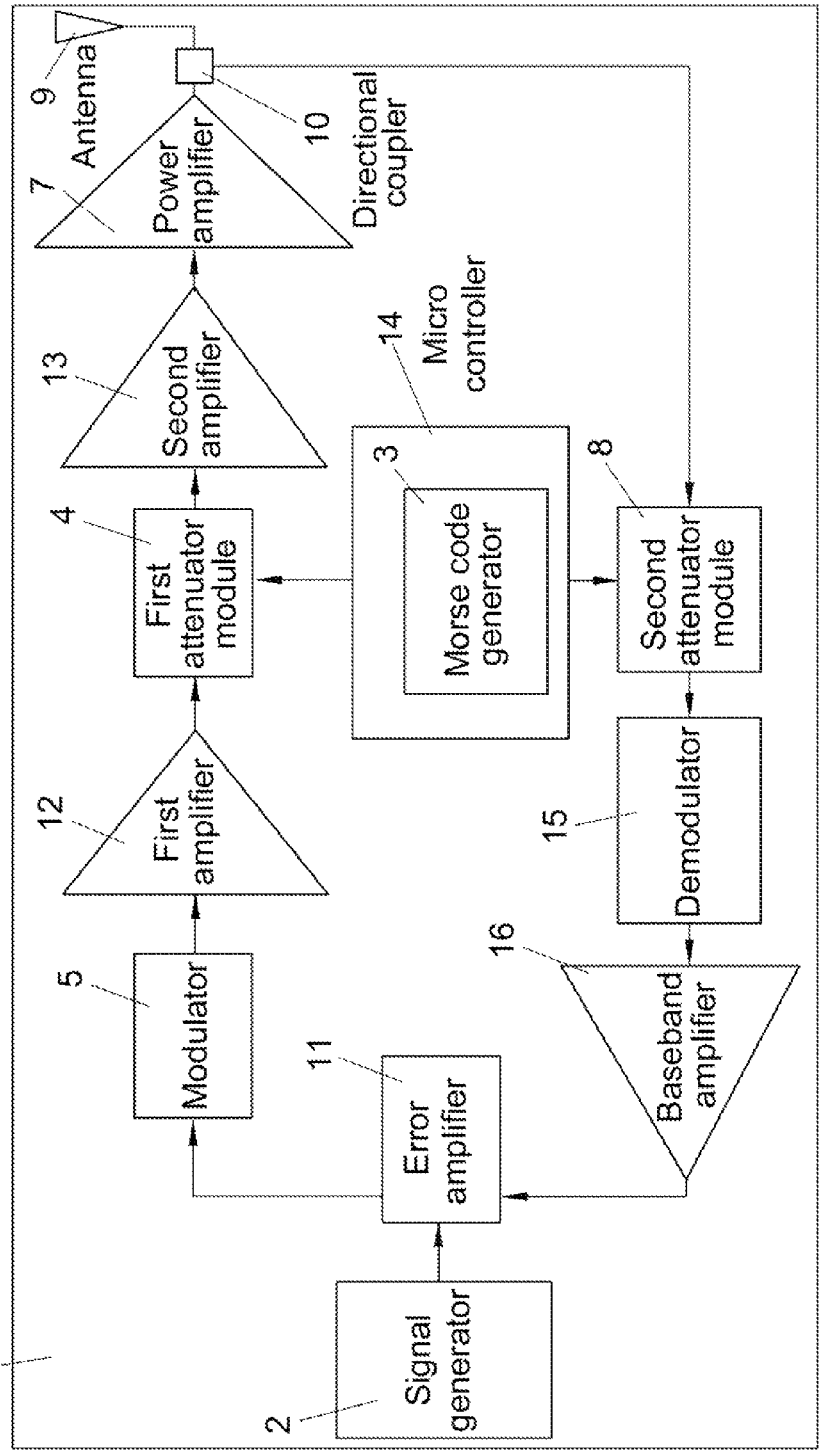
FIG. 5.—Shows a diagram of blocks of a transmission system that emits a RF signal with digital modulation over that which a Morse code is modulated in AM, in a way that the transmitter uses the Cartesian feedback as linearization technique.

FIG. 5 proposes a transmitter 1 with a Cartesian feedback for the linearization of the power amplifier 7. Forming the directional coupler 10, the second attenuator module 8, the demodulator 15, the baseband amplifier 16 and the error amplifier 11 a Cartesian feedback loop, configured to carry out the Cartesian feedback.

The signal generator 2 produces symbols, decomposed into signals in phase "$I_{in}$" and in quadrature "$Q_{in}$", corresponding to the digital modulation in the baseband; the signals "$I_{in}$", "$Q_{in}$", a signal "$I_{feedback}$" and a signal "$Q_{feedback}$" enter the error amplifier 11 being the signals "$I_{feedback}$" and "$Q_{feedback}$" produced by the baseband amplifier 16; the error amplifier 11 amplifies the signals "$I_{in}$-$I_{feedback}$" and "$Q_{in}$-$Q_{feedback}$"; the output signals "$I_{mod}$" and "$Q_{mod}$" of the error amplifier 11 enter the modulator 5 that generates the RF signal with digital modulation; the level of the RF signal is adjusted by means of the first amplifier 12; the adjusted RF signal enters the first attenuator module 4, where it is attenuated as a function of the amplitude of the waveform generated by the Morse code generator 3; the attenuated RF signal is amplified by the second amplifier 13 and by the power amplifier 7 to reach a final transmission power to be transmitted by the antenna 9 and, furthermore, a sample of the output signal of the power amplifier 7 is fed back to the error amplifier 11 by means of: the directional coupler 10; the second attenuator module 8 with which the output level of the directional coupler 10 is adjusted, and whose attenuation varies according to an inverse of a function that determines the attenuation of the first attenuator module 4 based on the amplitude of the waveform generated by the Morse code generator 3; the demodulator 15 that generates the signals "$I'_{feedback}$" and "$Q'_{feedback}$", and the baseband amplifier 16 that adjusts the level of the signals "$I'_{feedback}$" and "$Q'_{feedback}$" generating the signals "$I_{feedback}$" and "$Q_{feedback}$". In order to detect the Morse code from the RF signal with both superimposed modulations, digital and analog AM, it is enough to use one radio receptor of analog amplitude modulation (AM) and one standard Morse decoder.

The digital modulation produces a level of background noise in the AM receiver that does not impede the correct detection of the Morse code.

Furthermore, a radio receiver according to the standard of corresponding digital communications will be able to demodulate the symbols from the this same signal, and thus the added analog modulation is transparent for said digital receiver.

A person skilled in the art will understand that the mentioned forms of embodiments do not limit the scope of the invention, but rather are cited as particular modes of materializing the invention. For this reason, it should be understood that there may be changes in the functionality and disposition of the elements described, provided that the scope of the invention is not modified, which is reflected in the following claims.

The invention claimed is:

1. A system for simultaneous transmission of Morse signaling over a radio communication using digital technology, wherein the system for transmission (1) comprises:
   a signal generator (2) with at least one digital modulation having at least one amplitude modulation component;
   a Morse code generator (3) that generates a waveform comprising analog Morse tones;
   a first attenuator module (4), controlled by the Morse code generator (3);
wherein a signal with digital modulation generated by the signal generator (2), is attenuated in amplitude by the first attenuator module (4) in a way that the attenuation in amplitude is a function of the amplitude of the waveform generated by the Morse code generator (3), thus transmitting the information by means of digital modulation simultaneously with the transmission of the Morse code by means of analog amplitude modulation (AM) using one single radiofrequency (RF) signal carrier, without interruption or loss of information.

2. The system for transmission according to claim 1, wherein the signal generated by the signal generator (2) is a radiofrequency (RF) signal.

3. The system for transmission according to claim 1, further comprises a modulator (5) which is connected to the output of the first attenuator module (4), wherein the signal produced by the signal generator (2) is a baseband signal attenuated by the first attenuator module (4) before being provided to the modulator (5), wherein the output of the modulator (5) is a radiofrequency (RF) signal with digital modulation where there is at least one amplitude modulation component, and wherein the attenuation in amplitude is a function of the amplitude of the waveform generated by the Morse code generator (3).

4. The system for transmission according to claim 1, further comprising:
   a linearization block (6) connected to the output of the signal generator (2) and to the input of the first attenuator module (4);
   a power amplifier (7) connected to the output of the first attenuator module (4);
   a directional coupler (10) connected to the output of the power amplifier (7);
   an antenna (9) connected to the output of the directional coupler (10); and,
   a second attenuator module (8) connected to an additional output of the directional coupler (10) and to an additional input of the linearization block (6);
wherein the signal produced by the signal generator (2) passes through the linearization block (6) where it is predistorted;
subsequently the predistorted signal is provided to the first attenuator module (4) where it is attenuated as a function of the amplitude of the waveform generated by the Morse code generator (3);
subsequently, the attenuated signal is amplified to reach a final transmission power in the power amplifier (7) to be emitted by the antenna (9);
a sample of the output signal of the power amplifier (7) is fed back to the linearization block by the directional coupler (10) and the second attenuator module (8), whose attenuation varies according to an inverse of a function used to determine the attenuation of the first attenuator module (4) based on the amplitude of the waveform generated by the Morse code generator (3).

5. The system for transmission according to claim 1 further comprising:
   an error amplifier (11) connected to the output of the signal generator (2) and to the input of a modulator (5);
   a first amplifier (12) connected to the output of the modulator (5) and to the input of the first attenuator module (4);
   a second amplifier (13) connected to the output of the first attenuator module (4);
   a power amplifier (7) connected to the output of the second amplifier (13);
   a directional coupler (10) connected to the output of the power amplifier (7);
   an antenna (9) connected to the output of the directional coupler (10);
   a second attenuator module (8) connected to an additional output of the directional coupler (10);
   a demodulator (15) connected to the output of the second attenuator module (8);
   a baseband amplifier (16) connected to the output of the demodulator (15) and to an additional input of the error amplifier (11); and,
   a microcontroller (14) connected to the two attenuator modules (4 and 8) and the microcontroller (14) includes the Morse code generator (3) wherein the directional coupler (10), the second attenuator module (8), the demodulator (15), the baseband amplifier (16) and the error amplifier (11) form a Cartesian feedback loop, configured to carry out a Cartesian feedback for the linearization of the power amplifier (7); and wherein:
the signal generator (2) produces symbols, decomposed into signals in phase "$I_{in}$" and in quadrature "$Q_{in}$", corresponding to the digital modulation in the baseband;
the signals "$I_{in}$", "$Q_{in}$", a "$I_{feedback}$" and a signal "$Q_{feedback}$" enter the error amplifier (11), the signals "$I_{feedback}$" and "$Q_{feedback}$" are produced by the baseband amplifier (16);
the error amplifier (11) amplifies the signals "$I_{in}-I_{feedback}$" and "$Q_{in}-Q_{feedback}$";
output signals "$I_{mod}$" and "$Q_{mod}$" of the error amplifier (11) enter the modulator (5) that generates the RF signal with digital modulation;
the level of the RF signal is adjusted by the first amplifier (12);
the adjusted RF signal enters the first attenuator module (4), where the adjusted RF signal is attenuated as a function of the amplitude of the waveform generated by the Morse code generator (3) to form an attenuated RF signal;
the attenuated RF signal is amplified by the second amplifier (13) and by the power amplifier (7) to reach a final transmission power to be transmitted by the antenna (9) and, wherein,
a sample of the output signal of the power amplifier (7) is fed back to the error amplifier (11) by:
   the directional coupler (10),
   the second attenuator module (8) with which the output level of the directional coupler (10) is adjusted, and whose attenuation varies according to an inverse of a function that determines the attenuation of the first attenuator module (4) based on the amplitude of the waveform generated by the Morse code generator (3),
   the demodulator (15) that generates the signals "$I'_{feedback}$" and "$Q'_{feedback}$", and
   the baseband amplifier (16) that adjusts the level of the signals "$I'_{feedback}$" and "$Q'_{feedback}$" generating the signal "$I_{feedback}$" and "$Q_{feedback}$".

* * * * *